Nov. 13, 1934.    R. CHILTON    1,980,185
TORSIONAL VIBRATION DAMPER
Filed May 15, 1930    2 Sheets-Sheet 1
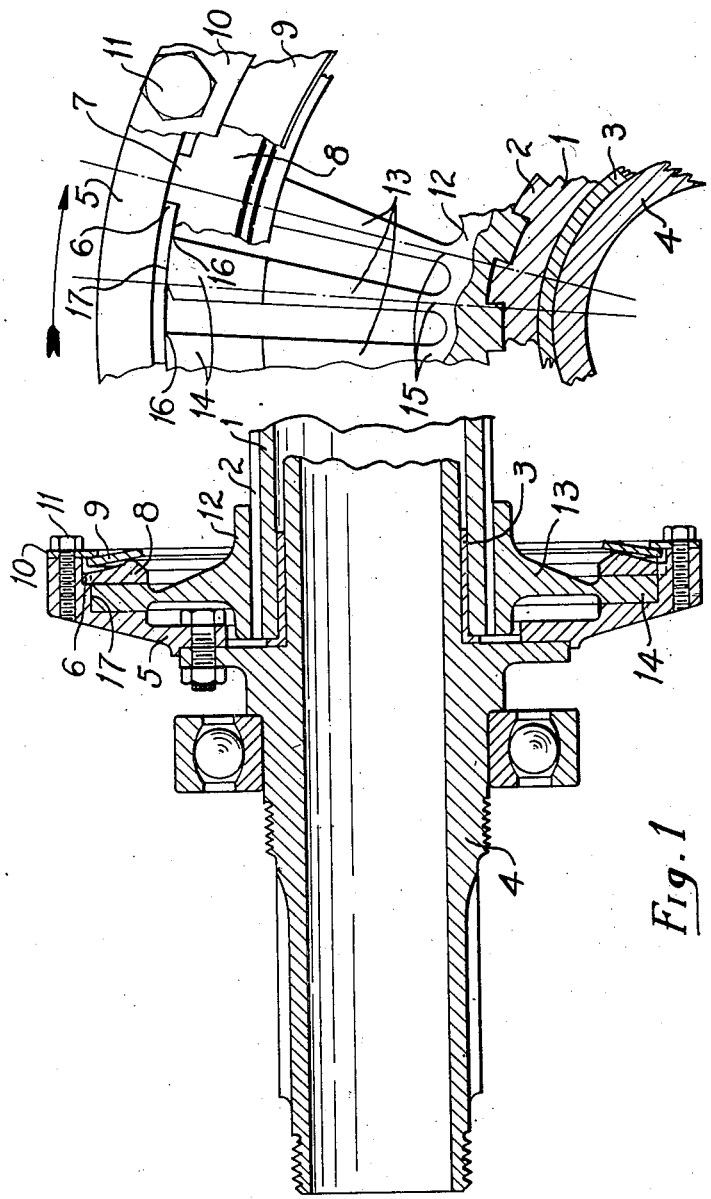
INVENTOR.
ROLAND CHILTON
BY
ATTORNEY.

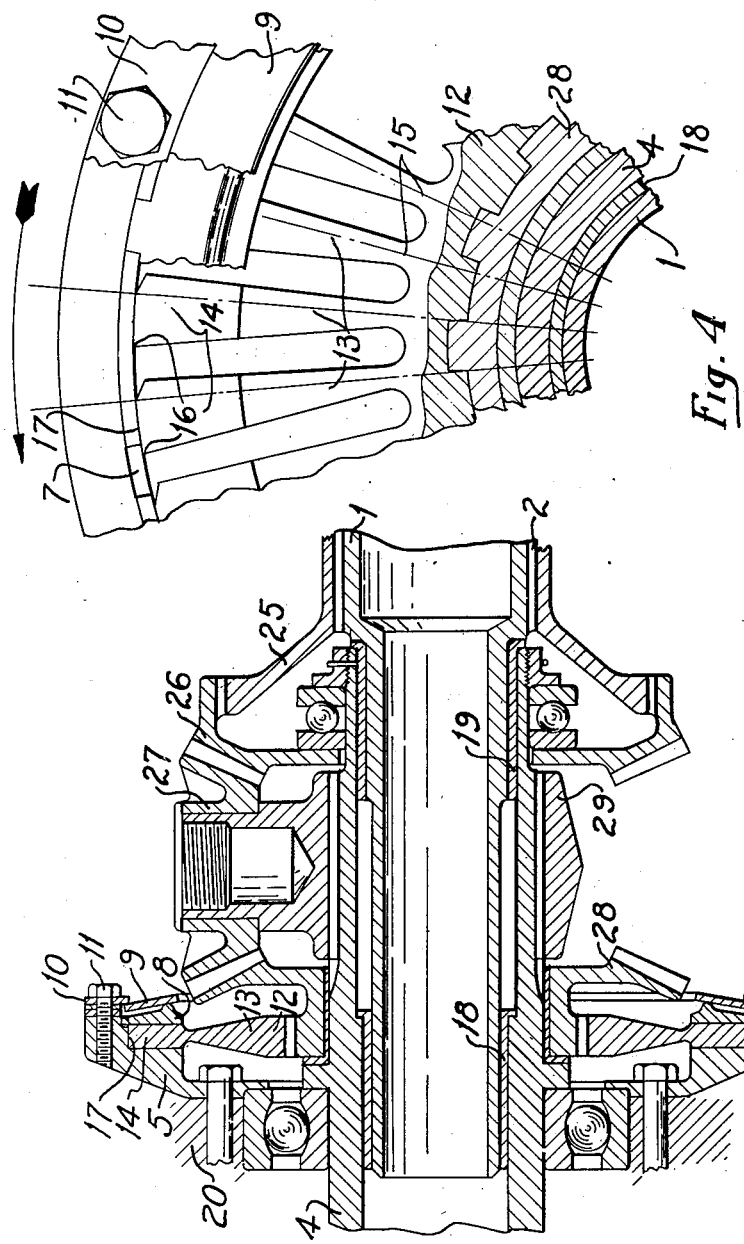

Patented Nov. 13, 1934

1,980,185

UNITED STATES PATENT OFFICE 1,980,185

TORSIONAL VIBRATION DAMPER

Roland Chilton, Ridgewood, N. J., assignor to Wright Aeronautical Corporation, a corporation of New York Application May 15, 1930, Serial No. 452,598

8 Claims. (Cl. 192—41)

This invention relates to devices for suppressing torsional vibrations in shaft systems, and more particularly to the crankshafts, and their associated driven mechanisms of aircraft engines.

Whenever two or more masses are secured to a shaft, any distance apart, the system has an inherent natural period of vibration predetermined by the torsional elasticity of the shaft and the magnitude of the masses. Whenever such a system is subjected to operating impulses synchronous to this natural period, the amplitudes of the vibrations increase cumulatively until they will cause failure of the shaft unless some damping force is interposed. The crankshaft system of an aircraft engine, with its rigidly associated propeller and crank masses, is an example where such vibrations have caused many shaft failures.

In the past, torsional vibration has been prevented by some form of frictional damping, usually in the form of an added mass frictionally driven from one end of the shaft and tending to rotate at a uniform speed (in spite of the vibratory rotation of the shaft) by slippage of the connection, which absorbs energy and hence dampens the vibrations.

It will be seen that when the relative torsional vibrations, between the associated masses, are superimposed upon the rotation of the shaft, certain points on the latter assume a cyclic variation in rotational speed which may be very destructive to any gears or other parts driven by the shaft. The stresses set up by these vibrations often greatly exceed the normal loading stress due to the power transmitted, and they are particularly destructive as they are alternately in the reversed and forward directions so that any backlash in the gears produces a destructive hammering action on the teeth.

At the point of maximum amplitude of each vibration a large amount of energy is elastically stored in the material of the shaft, which is transferred to kinetic energy in the propeller and associated masses at the instant of maximum velocity, i. e., of zero amplitude. So long as this interchange of energy takes place with little loss, which is the condition in any elastic and undamped system, resonance will always produce dangerous vibrations.

It will be seen that torsional vibrations are only possible in a system having equal elasticity under the forward and backward wind-up of the shaft and the present device comprises means of destroying the backward elasticity in the system and in minimizing the maximum possible torque in the non-driving direction.

The principal object of this invention is to construct a damper in conformity with the above conditions and requirements and I accomplish this by the insertion of a coupling in the system between the crankshaft and the propeller, or between a normally fixed gear of the propeller driving train and the frame or crankcase of the engine. This coupling has a one-way action whereby it is self-locking for forward drive but permits the propeller to overrun the engine and thus suppresses reverse torque loading. To permit the starting of the engine from the propeller, and to initiate the engaging action of the coupling, sufficient frictional restraint to the overrun is incorporated.

Another object of this invention is to provide a driving coupling between the crankshaft and propeller shaft of an engine, the coupling having a positive driving action in one direction of rotation, and a resilient frictional driving action in the reverse direction.

A further object is to provide such a coupling wherein the positive driving action may become effective regardless of the relative angular position of the driving and driven members of the coupling.

A further object is to provide such a coupling that operates wholly automatically, without need of manual control or external adjustment.

My invention is primarily a drive coupling between two power shafts, able to positively transmit torque in one direction of rotation and to allow the driven member to overrun the driving member when driving torque pulsations allow the speed of the driving member to become less than the speed of the driven member for fractional angular distances. Such overrunning action is simultaneously damped by a frictional element in the coupling so that the period of overrunning is made unequal in time to the period of power impulse in the driving member. By this damped action, synchronous vibration periods are eliminated.

My coupling is not to be confused with inertia flywheels frictionally or resiliently superimposed on a drive shaft or crankshaft. A primary objective in the aircraft engine art is to reduce weight, so that the addition of an extra flywheel to an aircraft engine is undesirable.

A coupling in this situation is required to assume and relinquish the drive with extreme rapidity, and any back-lash would generate destructive shock loading, the requirements being a form of coupling that will permit the overrun of the propeller but which will automatically and rigidly lock against forward slippage the instant the parts reach equal angular velocities. Any form of coupling which will achieve these results is within the scope of this invention, the preferred construction as shown in the drawings being a light and simple embodiment having the desired characteristics.

In the drawings, similar parts being designated by similar numbers, Fig. 1 is a section of the device as applied to an engine driving directly to the propeller.

Fig. 2 is a fragmentary elevation of the device on an enlarged scale.

Fig. 3 is a section of the device as applied to a propeller of the geared type.

Fig. 4 is a fragmentary elevation of the device on an enlarged scale.

In Fig. 1 and Fig. 2—1 is the tubular end of the crankshaft on which are formed the splines 2. Fitted to the interior of this shaft is the bearing 3 in which the propeller hub shaft 4 is free to turn. Attached to, or integral with, the propeller hub 4 is the disc 5.

The disc 5 has formed in it throughout its circumference serrations 6 which fitting into corresponding mating serrations 7 in the ring 8 serve to drive the ring 8 while allowing it to move freely axially.

The ring 8 is pressed axially against the disc 5 by the annular spring 9 which is put in compression by the clamping ring 10 secured to 5 by the bolts 11.

The piece 12 is composed of a hub part having internal splines mating with the splines 2 of the crankshaft. Extending radially from the hub are a number of integral projections 13, each having an extension or end portion 14 so formed that it can be clamped between 5 and 8. The peripheral edges of 14 turn with minimum clearance from 5 at 17. The projections 13—14 are in effect friction pawls flexing at 15, and the surface 17 of 5 is a ratchet with an infinite number of teeth. It will be observed that the radius thru the center of 15 does not pass thru the center of the part 14, so that when the pawls are flexed the edges 16 move out and engage the surface 17 forming a positive drive. It will be noted that the edges opposite to 16 are beveled off up to the radial line so that the pawls can only drive in one direction and the propeller hub shaft 4 can overrun the crankshaft 1.

Figs. 3 and 4 show the device as applied to a geared type of propeller drive. In this case the hub 12 with its pawls 13—14 again engages the clamping parts 5—8—9—10 and 11 which are now bolted to the crankcase 20. They thus do not revolve as in Fig. 1 but form a uni-directionally yieldable anchorage for the "fixed" gear 28 of the gear train, allowing it to turn if the propeller tends to overrun the engine.

In Fig. 3 the crankshaft 1 drives the gear 26 thru the double splined connecting member 25. Gear 26 in turn drives the planetary bevel gear 27 which is connected thru the spider 29 and fixed gear 28 in the usual manner to the propeller hub 4.

It is quite evident that the action of the device is to drive the propeller or other load positively in one direction, but to prevent a reversal of torque by allowing the driven member to overrun the driving member should the latter suffer a variation, periodic or otherwise, in its driving torque.

With this device in action in a drive it is obvious that the conditions necessary for torsional vibration cannot exist as the elasticity of the forward and backward windup of the shaft will be very dissimilar and any reverse torque loading suppressed.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A clutch comprising a driving member; a driven member; a hub secured to one of said members; a disc secured to the other said member, and surrounding said hub; means for providing a positive drive in one direction while allowing slippage in the opposite direction, said last named means comprising projections attached to the hub and contacting at their outer ends with the disc; said disc being disposed on one side of and in constant frictional contact with said projections; a flange attached to the disc and extending inward therefrom on the opposite side of the projections; and means for resiliently pressing the flange into frictional engagement with said projections, whereby an overload friction clutch is provided in addition to the uni-directional drive.

2. A clutch comprising a driving member, a driven member, a hub secured to the driving member, a disc secured to the driven member and surrounding said hub, means for providing a positive drive in one direction while allowing slippage in the opposite direction, said means comprising projections attached to said hub and contacting with said disc, said disc being disposed on one side of and in constant frictional contact with said projections, a flange attached to said disc and extending inward therefrom on the opposite side of the projections, and means for resiliently pressing said flange into frictional engagement with said projections, whereby an overload friction clutch is provided in addition to the uni-directional drive.

3. For use in combination with an internal combustion engine, a crankshaft, a tubular propeller shaft embracing and revoluble with respect to an end of said crankshaft, a driving connection between said shafts including a wheel having formed thereon radially offset spokes, a flanged disc engageable with the outer spoke ends, and means carried by said disc for resiliently urging said wheel thereagainst.

4. For use in combination with an internal combustion engine, a crankshaft, a wheel revoluble therewith and slidable longitudinally thereon, said wheel having formed thereon radially offset spokes, a propeller shaft, a flanged disc carried by said propeller shaft for engaging said spokes, and means carried by said disc for resiliently urging said spokes against said disc.

5. A clutch comprising a hub, a disk surrounding said hub, projections carried by said hub and engaging said disk and being arranged to permit rotation of said hub with respect to said disk in one direction only, while locking said disk and hub from relative rotation in the opposite direction, a flange attached to said disk and extending inwardly therefrom on one side of said projections, and means for resiliently pressing said flange into frictional engagement with said projections for damping relative rotation between said disk and said hub in said one permissible direction of rotation.

6. In combination, for use in a gear mechanism, a casing, a driving shaft in said casing, a driven shaft, gear mechanism connecting said driving shaft with said driven shaft including a gear normally fixed with respect to said casing, mechanism connecting said gear with said casing for permitting relative rotation at times of said gear in one direction only, said mechanism being adapted to instantaneously lock said gear against reverse rotation, and means associated with said mechanism for resisting said permissible rotation for the purpose of damping torsional oscillation between said driving shaft and said driven shaft.

7. The combination in an internal combustion engine having a crankshaft subject to torsional vibration and a propeller shaft, of an instantaneously engageable one-way clutch for effecting unidirectional drive from said crankshaft to said propeller shaft, said clutch comprising a pair of concentric members organized for locking engagement with each other in one direction of rotation of said crankshaft and for movement with respect to each other upon over-run of the crankshaft by the propeller shaft, and resilient means for constantly urging said clutch members into frictional engagement for frictionally retarding said over-run.

8. The combination in an internal combustion engine having a crankshaft subject to torsional vibration and a propeller shaft, of means for damping said torsional vibration comprising a one-way driving clutch connecting said crankshaft with said propeller shaft, said clutch including a driving element mounted on the crankshaft and a driven element mounted on the propeller shaft, said driving element being organized for instantaneous engagement with said driven member regardless of their relative angular position, and resilient means for constantly urging said driving and driven members into engagement for frictionally retarding over-run of said driving member by said driven member.

ROLAND CHILTON.